Patented Mar. 15, 1938

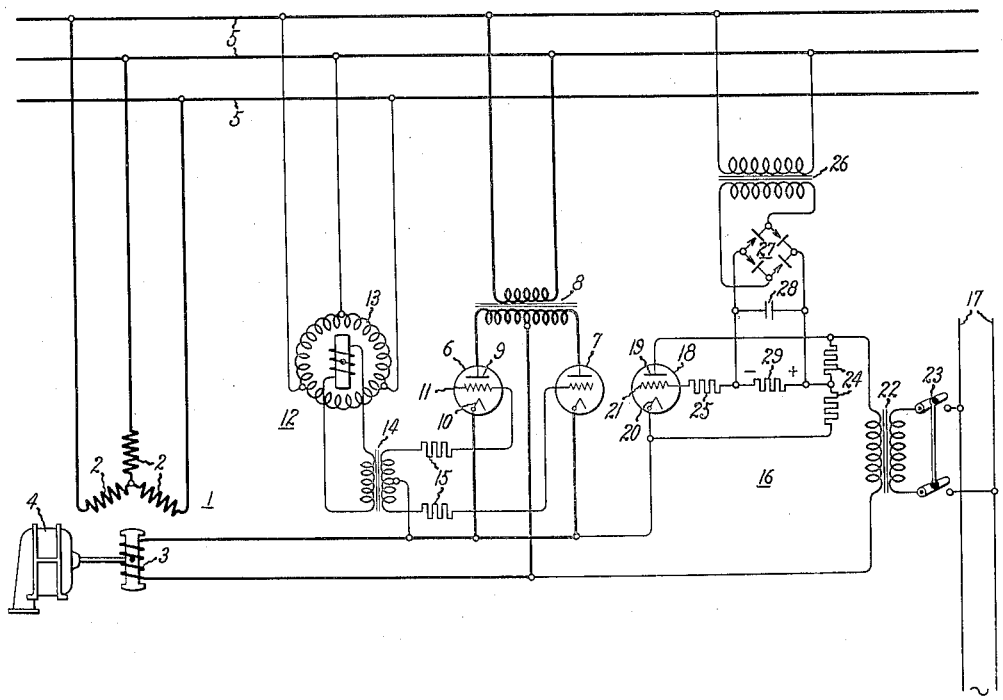

2,111,408

UNITED STATES PATENT OFFICE 2,111,408

EXCITATION SYSTEM FOR DYNAMO-ELECTRIC MACHINES

Erich Schröter, Berlin-Charlottenburg 4, Germany, assignor to General Electric Company, a corporation of New York Application June 26, 1937, Serial No. 150,557
In Germany October 17, 1936

4 Claims. (Cl. 171—119)

My invention relates to control systems and more particularly to excitation systems for dynamo-electric machines.

In the control of alternating current dynamo-electric machines of the self-excited type, it is frequently desirable to furnish the exciting current by means of electric valves which are energized from the machine itself. Furthermore, in many applications it is desirable to initiate the build-up of voltage of the machine during the starting operation without using complicated and expensive auxiliary equipment. Heretofore such arrangements have employed devices having movable parts to effect the change-over from the starting operation to the normal running operation. Some of the other prior art arrangements have employed the residual magnetism of the dynamo-electric machine to initiate the build-up of voltage during the starting operation, and this type of control has necessitated the employment of complicated and expensive auxiliary equipment. In view of the above factors, there has been evidenced a decided need for improved excitation by employing only those elements entirely electrical in nature and operation and in which the transition from the starting operation to the normal running operation may be effected smoothly without employing electro-mechanical devices.

It is an object of my invention to provide a new and improved excitation system for dynamo-electric machines.

It is another object of my invention to provide a new and improved electric valve system for energizing the field circuit of a self-excited dynamo-electric machine of the synchronous type.

It is a further object of my invention to provide a new and improved excitation system for self-excited dynamo-electric machines in which the build-up of voltage of the machine is initiated and maintained without employing expensive and complicated apparatus and which avoids the above mentioned disadvantages.

In accordance with the illustrated embodiment of my invention, I provide a new and improved excitation system for a self-excited alternating current dynamo-electric machine of the synchronous type. The excitation system comprises only elements entirely electrical in nature and operation, such as electric valve means and associated control equipment. More specifically, main electric valve means are connected between an armature winding of the machine and a field winding of the machine to supply direct current thereto during normal continuous operation, and an auxiliary electric valve means is employed to supply direct current to the field winding from an auxiliary source of alternating current to initiate the build-up of armature voltage of the machine to a value sufficient to permit the main electric valve means to supply the requisite direct current to the field winding. The auxiliary or control electric valve means is provided with a control member which controls the conductivity thereof. The excitation circuit includes a voltage divider which is energized from the auxiliary source of alternating current and impresses an alternating voltage on the control member of the auxiliary electric valve tending to render the electric valve conductive. The excitation circuit also includes a rectifier which is energized in accordance with the armature voltage of the machine for impressing on the control member of the auxiliary electric valve a negative unidirectional biasing potential which varies in accordance with the armature voltage and renders the auxiliary electric valve non-conductive when the armature voltage attains a predetermined value. The transition from the starting condition of operation to the running condition is effected without employing movable parts and is accomplished in a smooth and reliable manner.

For a better understanding of my invention, reference may be had to the following description taken in connection with the accompanying drawing, and its scope will be pointed out in the appended claims. The single figure of the accompanying drawing diagrammatically shows an embodiment of my invention as applied to an excitation system for a self-excited alternating current generator of the synchronous type.

Referring now to the single figure of the accompanying drawing, there is represented diagrammatically an excitation circuit for an alternating current dynamo-electric machine 1 of the synchronous type having an armature winding 2 and a field winding 3. The machine 1 may be driven by any suitable prime mover such as an elastic fluid turbine 4. Although in the particular arrangement shown in the single figure of the drawing I have chosen to show my invention as applied to an alternating current generator of the synchronous type, it is to be understood that my invention in its broader aspects may be applied to dynamo-electric machines generally in which it is desired to effect energization of one winding of a machine from another winding thereof. The armature winding 2 of dynamo-electric machine 1 is connected to an alternating current circuit 5.

An electric valve translating circuit including main electric valves 6 and 7 and a transformer 8 is connected between the alternating current circuit 5, or the armature winding 2 and the field winding 3, and is connected to supply direct current to the field winding 3 during the normal or continuous operation of the dynamo-electric machine 1. The main electric valves 6 and 7 are preferably of the type employing an ionizable medium, such as a gas or a vapor, and each includes an anode 9, a cathode 10, and a control member 11 which controls the conductivity of the associated discharge path. To control the energization of control members 11 and hence to control the conductivities of electric valves 6 and 7, there is provided a control circuit 12 including a conventional phase shifting arrangement such as the rotary phase shifter 13 and a transformer 14. The transformer 14 is arranged to impress alternating voltages on control members 11 of electric valves 6 and 7 through current limiting resistances 15, and the transformer 14 may be of the type designed to furnish an alternating voltage of peaked wave form, if desired. It is to be understood that the control circuit 12 may be either manually or automatically operated and that I may employ any conventional arrangement to effect this control automatically. Furthermore, it is to be understood that the circuit 12 may be arranged to control the conductivities of electric valves 6 and 7 and hence to control the excitation of the field winding 3 in accordance with a predetermined electrical condition such as the armature voltage of the dynamo-electric machine 1.

As a means for initiating the build-up of armature voltage of the machine 1 by supplying current to the field winding 3 during the starting operation, I provide an excitation circuit 16 including an auxiliary source of current which may be a source of alternating current 17 and an auxiliary or control electric valve means 18. The electric valve means 18 is preferably of the type employing an ionizable medium and comprises an anode 19, a cathode 20 and a control member 21. A transformer 22 may be employed as an element of the excitation circuit 16 and a switch 23 may be employed to connect transformer 22 to the auxiliary source of alternating current 17. To furnish a voltage which tends to render the electric valve means 18 conductive, I provide a voltage divider comprising resistances 24 which are connected in series relation across the electric valve means 18 and which are connected in series relation with a secondary winding of the transformer 22 and field winding 3 of dynamo-electric machine 1. A current limiting resistance 25 may be connected in series relation with the control member 21 of electric valve means 18. As an agency for rendering the electric valve means 18 non-conductive after the armature voltage of the dynamo-electric machine 1 attains a predetermined value, I provide a transformer 26 which is connected to the alternating current circuit 5, a rectifier 27, a capacitance 28 connected across output terminals of the rectifier 27 and a suitable impedance element, such as a resistance 29, which introduce in the excitation circuit a negative unidirectional biasing potential the magnitude of which varies in accordance with the armature voltage of machine 1. The capacitance 28 is charged by the rectifier 27 and operates to stabilize the negative unidirectional biasing potential and to absorb extraneous transient voltages which may be introduced in the excitation circuit from the alternating current circuit 5 or from the dynamo-electric machine 1.

While for the purpose of explaining my invention I have chosen to show the auxiliary source of current 17 as being alternating current, it will be well understood by those skilled in the art that I may employ a source of direct current in conjunction with any conventional expedient for effecting transformation of the direct current to alternating current to energize the excitation circuit 16. For example, a source of direct current and an electric valve inverter could be employed to transform the direct current to alternating current of a desired frequency to energize the excitation circuit 16.

The operation of the embodiment of my invention diagrammatically shown in the accompanying drawing will be explained when the dynamo-electric machine 1 is driven by the turbine 4 to supply energy to the alternating current circuit 5. For the purpose of explanation, it is assumed that the dynamo-electric machine 1 is the only source of voltage connected to the circuit 5. To initiate the operation of the system, the field structure of the dynamo-electric machine 1 is, of course, rotated by the prime mover 4 and the switch 23 is moved to the closed circuit position to impress across the anode 19 and cathode 20 of electric valve 18, through the field winding 3, an alternating voltage. There is also impressed across the voltage divider, including resistances 24, an alternating voltage. Since the voltage impressed on control member 21 of electric valve 18 through the voltage divider, including resistances 24, is in phase with the voltage impressed on the anode 19 thereof, the electric valve 18 will operate as a half wave rectifier to transmit pulsating unidirectional current to the field winding 3 of machine 1 to initiate the build-up of the armature voltage of the machine. As the armature voltage of the machine 1 increases due to the build-up of current supplied to the field winding 3, there will be attained a voltage sufficient to initiate discharges within electric valves 6 and 7 so that these valves begin to function to supply current to field winding 3. It is to be understood that since the transformer 26 is connected to alternating current circuit 5, there will be introduced in the excitation circuit 16, across resistance 29, a negative unidirectional biasing potential which varies in accordance with the voltage of the circuit 5 or in accordance with the armature voltage of the machine 1. As the voltage increases, the negative biasing potential will also increase and at a predetermined value of armature voltage the negative unidirectional biasing potential will be sufficient to render ineffective the alternating voltage provided by resistances 24 so that the electric valve 18 is rendered non-conductive.

It is to be understood that by the adjustment of the rotary phase shifter 13 the energization of the field winding 3 may be controlled to effect control of the terminal voltage of the machine 1. One of the principal advantages of my invention is the facility with which the transition from the starting operation to the continuous running operation is effected. In addition, if for any reason the electric translating circuit including electric valves 6 and 7 becomes temporarily defective so that the voltage of the alternating current circuit 5 decreases below a predetermined value, the excitation circuit 16 will automatically function to supply field current to the machine 1.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a dynamo-electric machine having a field winding and an armature winding, an electric valve means connected between said armature winding and said field winding for supplying direct current thereto, an auxiliary source of current, a second electric valve means having a control member for supplying direct current to said field winding from said auxiliary source to initiate the build-up of armature voltage of said machine, means energized from said auxiliary source tending to render said second electric valve means conductive, and means energized in accordance with the voltage of said armature winding to render said second electric valve means non-conductive when the voltage of said armature winding attains a predetermined value.

2. In combination, a dynamo-electric machine having a field winding and an armature winding, an electric valve means connected between said armature winding and said field winding for supplying direct current thereto, an auxiliary source of current, a second electric valve means having a control member for supplying direct current to said field winding from said auxiliary source to initiate the build-up of armature voltage of said machine, and a control circuit for energizing said control member including a voltage divider for impressing on said control member a voltage tending to render said second electric valve means conductive and means energized from said armature winding for providing a biasing potential to render said second electric valve means non-conductive when the voltage of said armature winding attains a predetermined value.

3. In combination, a dynamo-electric machine having a field winding and an armature winding, an electric valve means connected between said armature winding and said field winding for supplying direct current thereto during normal operation of said machine, an auxiliary source of alternating current, a second electric valve means having a control member for supplying direct current to said field winding from said auxiliary source to initiate the build-up of armature voltage of said machine, a voltage divider connected across said second electric valve means and energized from said auxiliary source for impressing on said control member a voltage tending to render said second electric valve means conductive, and means energized in accordance with the armature voltage of said machine for impressing on said control member a negative unidirectional biasing potential to render said second electric valve means non-conductive when the voltage of said armature winding attains a predetermined value.

4. In an excitation circuit for a dynamo-electric machine of the synchronous type having a field winding and an armature winding, the combination of electric valve means interposed between said armature winding and said field winding for supplying direct current thereto during normal operation, an auxiliary source of alternating current, a second electric valve means connected between said auxiliary source and said field winding for supplying direct current thereto to initiate the build-up of armature voltage of said machine, said second electric valve means having a control member for controlling the conductivity thereof, means energized from said auxiliary source comprising a voltage divider for impressing on said control member an alternating voltage tending to render said second electric valve means conductive, and means energized in accordance with the armature voltage of said machine comprising a rectifier for impressing on said control member a negative unidirectional biasing potential to render said second electric valve means non-conductive when the voltage of said armature winding attains a predetermined value.

ERICH SCHRÖTER.